Aug. 7, 1956
A. F. BILLARD
2,757,696
JUICE EXTRACTING MACHINES
Filed April 2, 1954
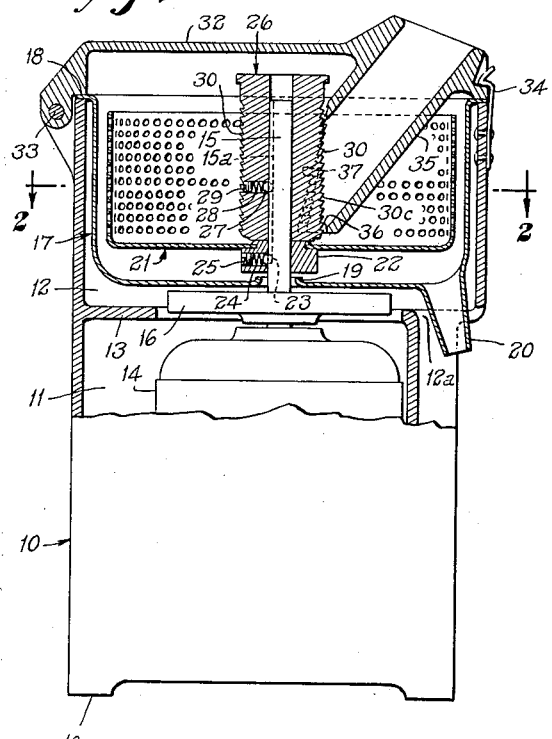
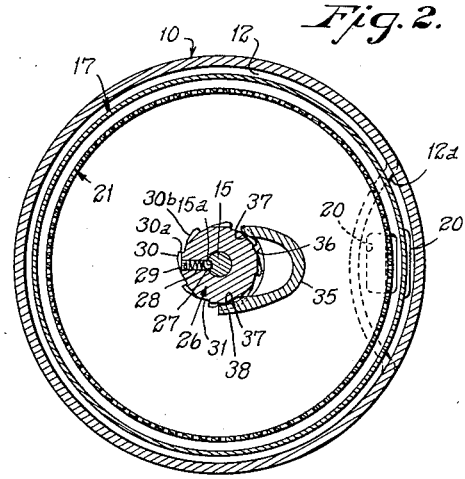
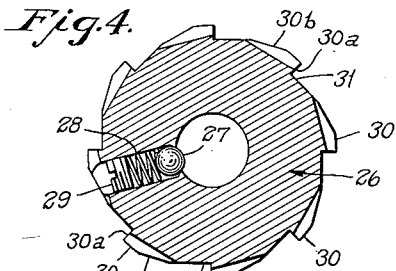
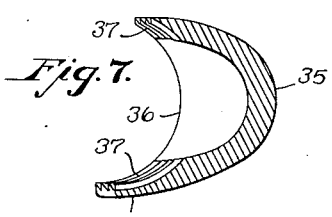
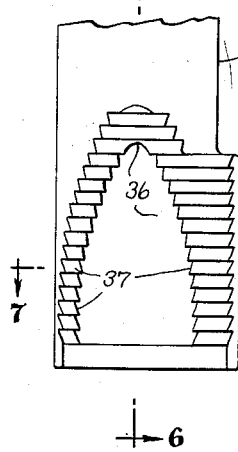
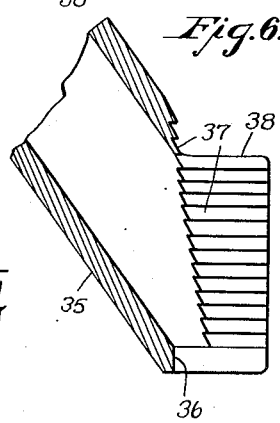
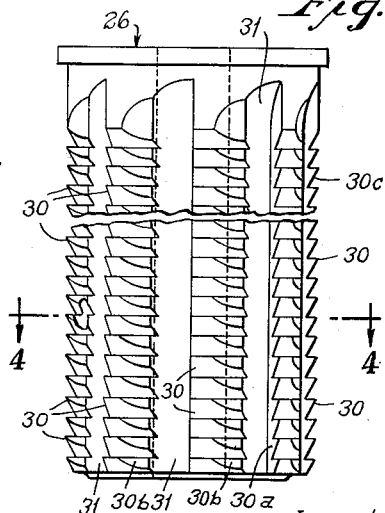
Inventor
Anthony F. Billard
By Pennie Edmonds Morton Barrows Taylor
Attorneys United States Patent Office 2,757,696
Patented Aug. 7, 1956

2,757,696

JUICE EXTRACTING MACHINES

Anthony Frederick Billard, Mansfield, Pa.

Application April 2, 1954, Serial No. 420,524

4 Claims. (Cl. 146—76)

This invention relates to machines for macerating and extracting juice from vegetables and fruits. More particularly, the invention is concerned with a macerating machine of the type described, which is simple in construction, operates with high efficiency, and can be easily kept clean.

Machines for macerating and extracting the juice from vegetables and fruits as heretofore constructed commonly include a rotating perforated receptacle and a macerating tool, which is disposed within the receptacle coaxially thereof. The tool is usually a flat disc with macerating elements on its upper surface, although it has been proposed to utilize a tool of frusto-conical form and place the macerating elements circumferentially thereon.

While macerating machines of the general construction above described have come into wide use, it will be apparent that they suffer from a loss of efficiency because the speed of the macerating elements on the tool varies with their distance from the axis of rotation. As a consequence, the elements close to the axis of rotation are of little effect and there is a substantial part of the tool, which is contributing little to the macerating action. Another objectionable feature of the prior machines is that they are difficult to keep clean because the receptacle and tool cannot be easily removed and replaced. Also, in some machines, the vessel, within which the receptacle rotates and which collects the juice, is an integral part of the machine structure and cannot be detached from the machine for cleaning purposes.

The present invention is directed to the provision of a macerating machine, which overcomes the objections to the prior machines. In the new machine, the macerating tool is of cylindrical form, with the macerating elements mounted thereon circumeferentially in rows. The products to be macerated are fed to the tool through a chute, which is disposed at an angle of the axis of rotation of the tool and has an opening at its lower end, which extends the full length of the area of the tool carrying the macerating elements. The edges of the opening lie close to the surface of the tool and are formed with macerating elements mating with those on the tool. The tool and receptacle are mounted on the shaft of a motor by quick detachable means and the vessel, in which the receptacle rotates, may be separate from the machine structure and easily removable therefrom.

For a better understanding of the invention, reference may be had to the accompanying drawings, in which Fig. 1 is a vertical view, partly in section and partly in elevation, of a machine embodying my invention;

Fig. 2 is a sectional view on the line 2—2 in Fig. 1;

Fig. 3 is an enlarged view, partly in section and partly in elevation, of a macerating tool used in my present machine;

Fig. 4 is a sectional view on the line 4—4 in Fig. 3;

Fig. 5 is an elevational view of the lower end of the chute, which cooperates with the macerating tool; and Figs. 6 and 7 are sectional views on the lines 6—6 and 7—7, respectively, in Fig. 5.

The machine shown in the drawings comprises a housing 10 having feet 10a, on which the machine may rest on a supporting surface. The interior of the housing is divided into a lower compartment 11 and an upper compartment 12 by a horizontal partition 13 having a central opening, and a passage 12a leads downwardly and outwardly from the outer edge of the upper compartment. A motor 14 is suitably mounted in the lower compartment with its shaft 15 projecting upwardly through the opening in the partition and a flywheel disc 16 is mounted fast on the shaft to lie partly within the opening through the partition. The shaft is provided with a longitudinal keyway 15a extending from its upper end down to a point a short distance above the disc.

The upper compartment of the housing contains a vessel 17 having a circumferential flange 18 at its top, which lies on top of the upper end of the housing. The vessel has a central opening in its bottom for the passage of shaft 15 and the opening is surrounded by a vertical flange 19. The vessel is also provided with a downwardly extending spout 20, which projects outwardly through opening 12a.

A perforated receptacle or screen 21 is mounted on the shaft by means of a hub 22 having an opening, through which the shaft extends. The receptacle is secured to the shaft for rotary movement therewith by means of a ball 23 mounted in a radial passage in the hub and forced by a spring 24 into keyway 15a in the shaft. The spring is held in place by a screw 25 threaded into the end of the passage. The ball rests at the bottom of the keyway and holds the hub above the flange 19 on the vessel.

A macerating tool 26 is mounted on shaft 15 and rests on the inner surface of the bottom of the receptacle 21. The tool is secured to the shaft for rotary movement therewith by any suitable means, such as a ball 27 urged by a spring 28 into the keyway on the shaft, the spring being held in place by a screw 29 threaded into the outer end of the passage. The macerating tool is of cylindrical form and it is provided on its circumferential surface with macerating elements in the form of teeth 30, which are arranged in circumferential rows with adjacent teeth in each row separated by longitudinal channels 31. The teeth may have different forms and those shown have substantially radial front faces 30a and their outer surfaces 30b slope inwardly to the rear and are also undercut as shown at 30c.

The top compartment of the housing is provided with a cover 32, which is hinged at 33 on a bracket integral with the housing. The cover is held in place in any suitable manner and, for this purpose, the housing may be provided with a spring latch 34 attached to the outer surface of the wall of the top compartment near the upper edge thereof and having a portion overlying the rim of the cover, when the latter is seated on the flange 18 of the vessel. The cover is formed with an integral feed chute 35 opening through the cover adjacent the rim of the cover opposite the hinge and of circular cross-section at its open end. The chute extends downwardly at an angle to the axis of the shaft 15 and, at its lower end, the chute has an opening 36 of pointed arch shape. Along the sides of opening 36, the wall of the chute is provided with teeth 37 which mate with the teeth on the tool 26. At one side of opening 36, the wall of the opening is widened, as shown at 38, to form a deflecting plate extending substantially tangentially relative to the tool 26. The chute is preferably of such diameter that its lower end embraces a substantial arc of the circumference of the tool, and the lower end opening extends throughout the length of the effective area of the tool, that is, the area provided with macerating elements.

In the operation of the machine in the extraction of juice from vegetables, for example, the vegetables are inserted into chute 35 and moved down until they come into contact with the rapidly rotating macerating tool at the lower end of the chute. The teeth on the tool tear pieces from the vegetables and carry the pieces toward the edge of the bottom opening provided with a deflecting plate 38. If the pieces torn are too large to pass through the spaces between adjacent teeth on the deflecting plate, a further tearing action is effected by the cooperation of the teeth on the tool with those on the plate. The pulp produced by the macerating action and carried out between the teeth on the plate is thrown centrifugally at high speed against the inner surface of the perforated receptable 21 and the juice runs through the perforations and collects in the vessel 17 to flow out through spout 20, while the pulp is retained within the receptacle.

When the macerating operation has been completed and it is desired to clean the machine, the cover is swung upwardly, so that the tool and the interior of repectacle 21 are exposed, after which the tool and receptacle can be slid upwardly off the shaft. The tool and receptacle can then be cleaned and sterilized, as desired. With the cover raised, the vessel 17 may also be lifted out of the housing and cleaned. When the cover is thus raised, the chute and the deflecting plate are fully accessible and can be easily cleaned. When the parts are to be reassembled, the vessel is first inserted in position and the receptacle and tool are then mounted in that order on the motor shaft.

In the machine described, it will be apparent that, since the tool is of cylindrical form and all the teeth are at equal distances from the axis of rotation, all the teeth have the same angular velocity, so that they are all equally effective in performing a macerating action. As a result, the machine extracts juice from fruits and vegetables at a rapid rate. All the parts of the machine, which come in contact with the vegetables and fruits or the juices, are easily removed or otherwise made accessible for cleaning and the machine can thus be readily kept in sanitary condition.

I claim:

1. In a macerating machine, the combination of a perforated open-ended receptacle, a rotary tool of substantially cylindrical form having circumferentially spaced macerating elements disposed within and coaxially of the receptacle, means for rotating the receptacle and the tool, and a chute extending into the open end of the receptacle at an angle to the axis of rotation thereof, the chute having an opening at its inner end extending substantially the length of the effective area of the tool, the side edges of the chute opening having macerating elements cooperating with those on the tool.

2. In a macerating machine, the combination of a housing, a motor mounted in the housing and having a drive shaft, a vessel removably mounted within the housing and having a bottom opening, through which the shaft extends, the opening being surrounded by an inwardly extending flange, a perforated receptacle mounted on the shaft within the vessel, a macerating tool mounted on the shaft within the receptacle, the receptacle and tool being removable endwise off the shaft, the tool being of generally cylindrical form and having circumferentially arranged macerating elements, a cover for the vessel, and a chute opening through the cover and extending into the receptacle at an angle to the axis of rotation thereof, the lower end of the chute lying close to the tool and extending substantially the entire length of the effective area of the tool, the edges of the chute opening having macerating elements cooperating with those on the tool.

3. In a macerating machine, the combination of a perforated open-ended receptacle, a rotary tool of substantially cylindrical shape mounted within and coaxially of the receptacle, the tool having macerating elements on its circumferential surface, means for rotating the receptacle and the tool, a chute extending into the open end of the receptacle at an angle to the axis of rotation thereof, the inner end of the chute lying close to the tool and extending substantially the length of the effective area on the tool, and a deflecting plate on the inner end of the chute and lying substantially tangential to the tool, the edges of the inner opening of the chute and the inner surface of the deflecting plate being provided with macerating elements cooperating with those on the tool.

4. In a macerating machine, the combination of a housing having a lower compartment and an upper compartment, a motor mounted in the lower compartment and having a drive shaft extending into the upper compartment, a vessel removably mounted in the upper compartment and having a bottom opening, through which the shaft extends, the opening being encircled by an upstanding flange, a spout extending from the bottom of the vessel through an opening in the wall of the housing, a perforated receptacle mounted on the shaft within the vessel, a macerating tool mounted on the shaft within the receptacle, the tool being of generally cylindrical form and having circumferentially arranged macerating elements, a cover for the vessel, a chute attached to and opening through the cover and extending into the receptacle at an angle to the axis of rotation thereof, the lower end of the chute lying close to the tool and extending substantially the entire length of the effective area of the tool, a deflecting plate carried by the chute at its inner end and lying substantially tangential to the tool, and macerating elements on the wall of the opening of the chute and on the deflecting plate cooperating with those on the tool.

References Cited in the file of this patent

UNITED STATES PATENTS

| | | |
|---|---|---|
| 2,131,377 | Kohl | Sept. 27, 1938 |
| 2,223,772 | Waller et al. | Dec. 3, 1940 |
| 2,297,880 | Fredrickson | Oct. 6, 1942 |
| 2,541,084 | Meier et al. | Feb. 13, 1951 |

FOREIGN PATENTS

| | | |
|---|---|---|
| 236,204 | Switzerland | May 16, 1945 |